United States Patent
Greune

[15] 3,657,880
[45] Apr. 25, 1972

[54] CONTROL INSTALLATION FOR GAS TURBINE ENGINES

[72] Inventor: Christian Greune, Furstenfeldbruck, Germany

[73] Assignee: Motoren-und Turbinen-Union Munchen GmbH, Munchen, Germany

[22] Filed: June 17, 1970

[21] Appl. No.: 47,081

[30] Foreign Application Priority Data

June 19, 1969 Germany .................. P 19 31 045.3

[52] U.S. Cl. .................. 60/39.28, 138/43, 251/126, 418/141
[51] Int. Cl. .................. F02c 9/08
[58] Field of Search .................. 60/39.28 R; 251/126; 138/43

[56] References Cited

UNITED STATES PATENTS

| 3,509,720 | 5/1970 | Warne | 60/39.28 |
| 3,511,047 | 5/1970 | Yates | 60/39.28 |
| 2,323,115 | 6/1943 | Bryant | 138/43 |
| 3,498,058 | 3/1970 | Greune | 60/39.28 |
| 2,299,540 | 10/1942 | Hartline | 138/43 X |
| 2,506,179 | 5/1950 | Taplin | 138/43 |
| 3,018,041 | 1/1962 | Bidwell | 251/126 X |
| 3,106,934 | 10/1963 | Rogers | 60/39.28 X |
| 3,373,772 | 3/1968 | Hilgert | 138/43 |
| 3,438,199 | 4/1969 | McGinnis | 60/39.28 |
| 3,508,562 | 4/1970 | Sebestyen | 251/126 X |

FOREIGN PATENTS OR APPLICATIONS

| 1,035,230 | 7/1966 | Great Britain | 60/39.28 |

Primary Examiner—Clarence R. Gordon
Attorney—Craig, Antonelli & Hill

[57] ABSTRACT

A control system for controlling the metered fuel fed to the combustion chamber of a turbine, in which the amount of fuel is varied as a function of a partial pressure ratio dependent on the ratio of delivery pressure to inlet pressure of the compressor.

31 Claims, 7 Drawing Figures

CONTROL INSTALLATION FOR GAS TURBINE ENGINES

This invention relates to a control device which is used in connection with fuel control units of gas turbine engines.

In fuel control units of the prior art, the compressor delivery pressure $p_2$ is used in addition to other parameters for the fuel metering. Under certain engine operating conditions, however, this type of fuel control does not yield optimum results.

The object of the present invention is to ensure an engine fuel supply, as metered by the fuel control unit, which is better adapted to the actual requirement of the engine during the starting, acceleration and deceleration or in case of major variations in ambient pressure or ambient temperature.

The underlying problems are solved by the present invention in that the amount of fuel metered by a fuel control unit is influenced by a partial pressure ratio which again depends upon the total compressor pressure ratio, whereby the control pressure signal is taken off as partial pressure signal from series-connected restriction orifices or throttling places which are in communication with both the compressor inlet and the compressor outlet pressure.

With the hitherto known fuel control units, the fuel metering is based upon the formula $B = K \cdot p_2$, where the constant $K$ is a function of maximum engine load, $p_2$ is the compressor delivery or end pressure, $B$ is the fuel quantity and the flow factor is approximately 1. According to the present invention, it is proposed to provide a greater number of identical series-connected restriction orifices or throttling places, operating as a function of the compressor delivery or end pressure so that fuel quantity $B$ can be determined according to the following formula: $B = K [p_2 \cdot f(\pi)]^\alpha = K p_2^\alpha \cdot f(\pi)^\alpha$, where the fuel flow $B$ to be metered to the engine, in addition to being dependent on the compressor delivery pressure $p_2$, depends upon another function, i.e., the compressor pressure ratio $\pi$ of the engine.

If now the partial pressure signal to be taken off from the restriction orifices or throttling places at different locations, is used for the fuel metering, it is suggested according to the present invention to provide at least 25 restriction orifices between the compressor inlet and outlet pressure to ensure small pressure increments whereby the characteristic of the control pressure $p_z$ is taken only from the first few restriction orifices or throttling places, as viewed in the flow direction.

Moreover, with an increasing number of restriction orifices or throttling places, the partial pressure ratio $p_z/p_2$ decreases, whereby starting with a certain total ratio $p_2/p_1$—depending upon the number of restriction orifices—the partial pressure ratio remains constant.

Another feature of the present invention is the possibility to vary the number of restriction orifices in opposing directions between the compressor delivery pressure $p_2$ and the control pressure $p_z$ as well as between the control pressure $p_z$ and the compressor inlet pressure $p_1$.

Furthermore, it will be possible to vary the number of restriction orifices or throttling places between the control pressure and the compressor delivery pressure on the one hand, and between the control pressure and the compressor intake pressure, on the other hand, as a function of the compressor air intake temperature or of the compressor delivery air temperature, for example, by employing a labyrinth shaft providing restriction orifices or throttling places which is moved axially by bimetallic discs so that the picked-up partial pressure $p_z$ controls the amount of fuel as a function of temperature.

These and further objects, features and advantages of the present invention will become more obvious from the following description when taken in connection with the accompanying drawing which shows, for purposes of illustration only, several embodiments in accordance with the present invention, and wherein.

Figure 1A:
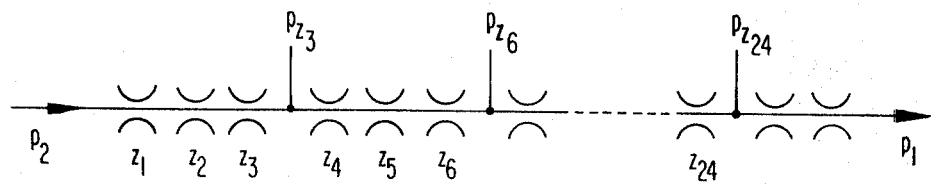
FIG. 1a is a schematic diagrammatic view for 25 restriction orifices.
Figure 1B:
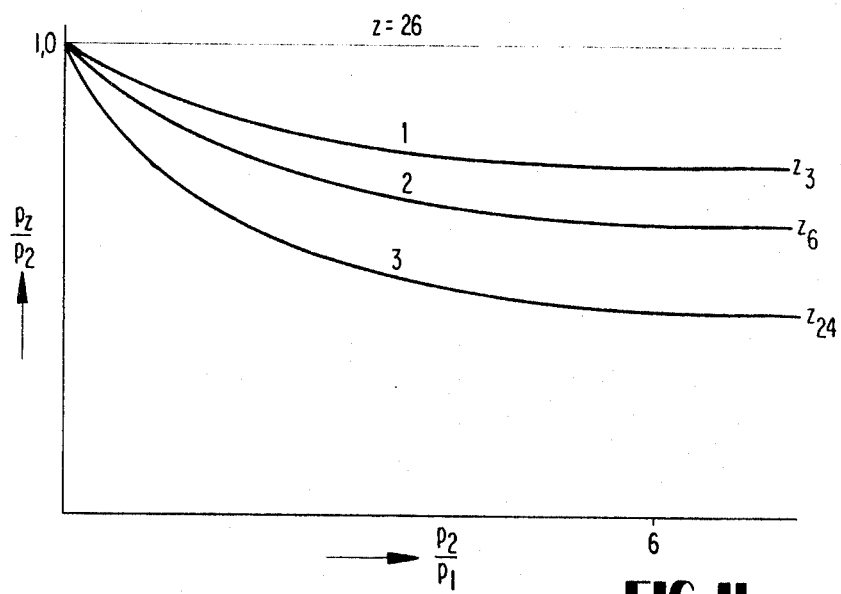
FIG. 1b is a schematic diagram illustrating the relationship between partial pressure ratio $p_z/p_2$ and total pressure ratio $p_2/p_1$ at various restriction orifices or throttling places.

Referring now to the drawing wherein like reference numerals are used throughout the various views to designate like parts, FIG. 1a shows a schematic control diagram with, for example, 26 restriction orifices or throttling places ($z_1$ to $z_{26}$) while FIG. 1b illustrates the relation between the partial pressure ratio $p_z/p_2$ and the total pressure ratio $p_2/p_1$ by considering various restriction orifices.

The compressor delivery pressure $p_2$ and the compressor inlet pressure $p_1$ are separated by 26 restriction orifices whereby it can be seen from FIG. 1a that in this case the partial pressure signal $p_z$ is taken downstream of every third restriction orifice.

As can be seen from the diagram of FIG. 1b, the partial pressure ratios $p_{z3}/p_2$ are represented by curve 1, $p_{z6}/p_2$ by curve 2 and $p_{z24}/p_2$ by curve 3 which extend from a point $p_z/p_2 = 1$ at $p_z/p_1 = 0$ in a parabolic shape and run out into straight lines parallel to the abscissa.

From the fuel control according to the present invention, it can be concluded therefrom that with a corresponding reduction in the number of restriction orifices or throttling places, e.g., through the influence of temperature in the pressure range $p_2$ at the compressor outlet, the partial pressure ratio $p_{z6}/p_2$ increases to $p_{z3}/p_2$ with the total pressure ratio $p_2/p_1$ remaining constant, so that fuel supply is controlled according to this partial pressure value.

When the total pressure ratio changes in the range of $p_2/p_1 = 6$, with the number of restriction orifices between the control pressure signal and the compressor delivery pressure, however, remaining constant, a constant partial pressure ratio $p_z/p_2$ results. Downstream of the sixth restriction orifice, the partial pressure ratio $p_{z6}/p_2$, for example, would follow curve 2.

Figure 2:
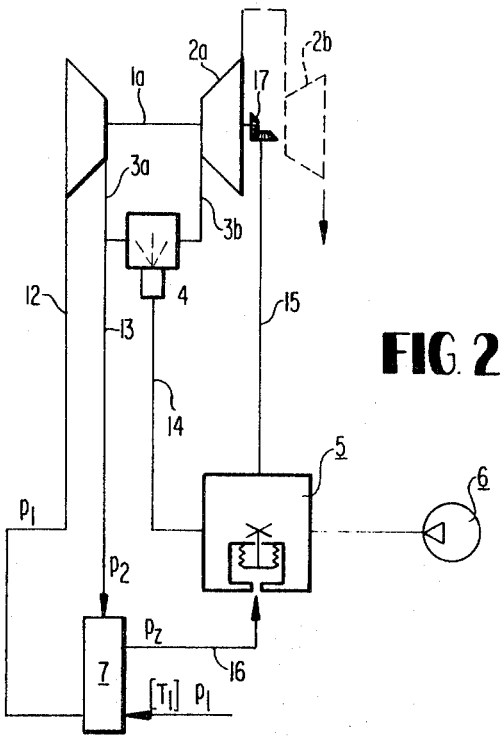
FIG. 2 is a schematic control diagram of a first embodiment explaining the present invention.

FIG. 2 is a schematic view of a known gas turbine engine comprising a compressor 1 and a combustion chamber 3 connected to the compressor by way of the duct 3a and a compressor turbine 2a connected to the combustion chamber 3 by way of the duct 3b; the compressor turbine 2a is connected with the compressor 1 by means of a shaft 1a. The free energy of the engine can be further utilized in the free power turbine 2b.

The fuel is fed by pump 6 to the fuel control unit 5 which supplies the combustion chamber 3 with fuel by way of line 14 and the injection nozzle 4. On the turbine end extension of shaft 1a is provided a pair of bevel gears 17 transmitting a speed signal representing rotational speed deviation to the fuel control unit 5 by way of shaft 15.

The fuel control unit 5 includes a conventional control device influencing the fuel flow or fuel quantity as a function of the partial pressure $p_z$, whereby according to the known arrangement as described, for example, in U.S. Pat. No. 3,498,058, the contents of which are incorporated herein by reference to the extent necessary, logarithmic pressure signals are transferred to the control spool or slide valve which varies, i.e., closes off more or less the area of a metering cross section with exponential stroke/flow characteristic, whereby the metering cross section is shifted relative to the control slide valve as a function of the speed deviation.

The partial pressure $p_z$ taken off from pressure splitter 7 results from the ratio between the compressor inlet and the compressor delivery pressure $p_1/p_2$. The delivery pressure $p_2$ is taken directly from the connecting line between the compressor and the combustion chamber and fed to the pressure splitter 7 through the line 13.

Figure 3:
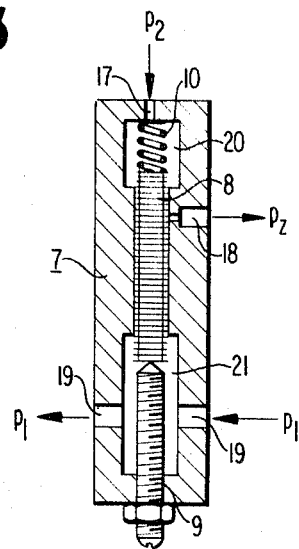
FIG. 3 is a cross-sectional view of one embodiment of a pressure splitter providing partial pressure in accordance with the present invention.

The construction of the pressure splitter 7 will be described by reference to FIG. 3. The pressure splitter housing has two hollow compartments or spaces 20 and 21, each provided with several ports or bores. The compressor delivery air at the pressure $p_2$ enters the hollow space 20 through port 17, while the compressor inlet air at the pressure $p_1$ enters the hollow space 21 through the transverse bore 19. The hollow spaces 20 and 21 are connected with each other by way of a bore in which is arranged the labyrinth spindle 8 of conventional construction producing restriction orifices or throttling places, which is positioned at the compressor air inlet end thereof by the set screw 9 and at the compressor air outlet end by the spring 10. The labyrinth spindle 8 can be axially displaced by means of the set screw 9.

In the upper pressure splitter housing, a bore 18 is provided normal to the housing longitudinal axis which leads to the axial connection of the two compartments or hollow spaces 20 and 21 and from which a partial pressure signal $p_z$ can be taken which is a function of the compressor ratio $p_2/p_1$.

The labyrinth spindle 8 consists of a cylindrical rod core with cam-type rings arranged at its circumference over the entire length. A predetermined clearance exists between these cam-shaped rings and the pressure splitter housing.

Figure 4:
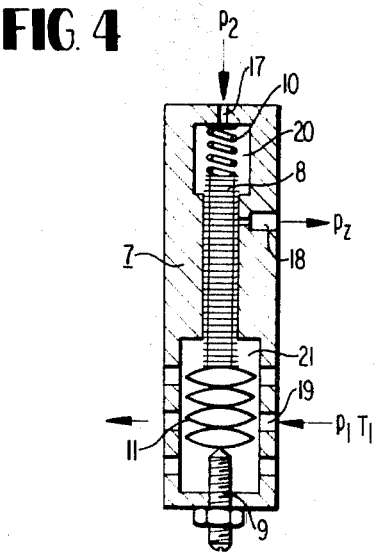
FIG. 4 is a cross-sectional view of another embodiment of a pressure splitter of the present invention influenced by temperature.

FIG. 4 shows another embodiment of a pressure splitter 7, in which the partial pressure $p_z$ is additionally influenced by the temperature of the compressor inlet air $T_1$. This is accomplished by bimetallic discs 11 between the labyrinth spindle 8 and the set screw 9. With increasing air temperature $T_1$, the labyrinth spindle 8 is moved axially against the spring 10, which at the same time, results in an increased number of restriction orifices between the control pressure $p_z$ and the compressor delivery pressure $p_2$. The control pressure $p_z$—measured as partial pressure ratio $p_z/p_2$—is reduced as described with reference to FIG. 1b and the amount of metered fuel is decreased.

Figure 5:
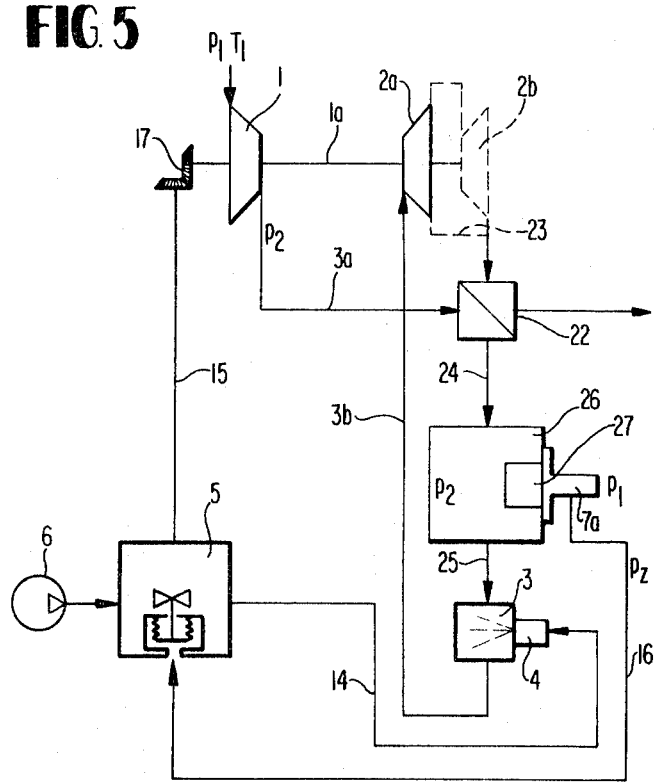
FIG. 5 is a schematic control diagram of a second embodiment explaining the present invention.

FIG. 5 is a schematic view of another arrangement of a control device according to the present invention which differs from the arrangement described in FIG. 2 essentially in that the air temperature upstream of the combustion chamber is used as a control signal for changing the partial pressure $p_z$. In this case the air compressed in the compressor (pressure $p_2$) is fed to a heat-exchanger 22 by way of a line 3a, which heat-exchanger is supplied by way of line 23 with combustion air leaving the compressor turbine 2a in uniflow or counter-flow direction, so that the compressor delivery air is preheated as a result of the heat transfer. Subsequently, the compressor air, thus preheated, flows through the line 24 into a chamber 26 containing a temperature-sensitive pressure splitter 7a, as described in connection with FIG. 6, from which the control pressure signal $p_z$ is taken off and fed to the above-described fuel control unit 5 by way of line 16.

The main flow of the pre-heated combustion delivery air is used for the combustion of the fuel metered by the fuel control unit 5 as a function of control pressure $p_z$ and of rotational speed and is then passed by way of line 3b to the turbine 2a.

The fuel delivery by the pump 6 flows to the injection nozzle 4 by way of line 14 and is injected into the combustion chamber 3 where it is burnt with the pre-heated and compressed air.

Figure 6:
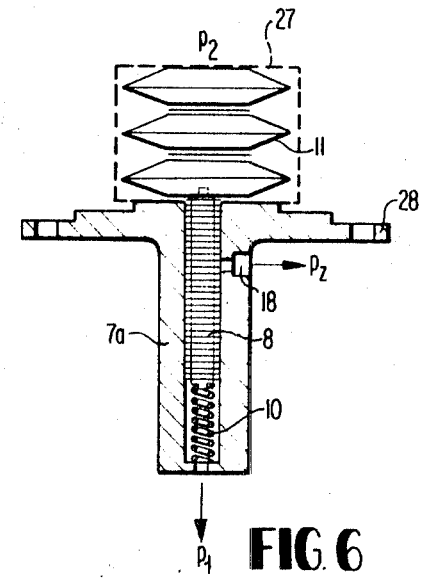
FIG. 6 is a cross-sectional view of a second embodiment of a pressure splitter according to the present invention influenced by temperature.

The temperature-sensitive pressure splitter 7a can be seen in FIG. 6, which in particular is employed in the case where a partial pressure signal is taken off directly upstream of the combustion chamber or downstream of the compressor. The already-mentioned chamber 26, through which pre-heated compressor delivery air passes, is provided with a bore which, for example, is arranged normal to the direction of air flow, into which pressure splitter 7a is slipped and secured to the chamber housing.

In the case considered, the pressure splitter 7a consists of an axially symmetrical hollow body comprising a hollow cylinder with flanges 28 at the end face for mounting the pressure splitter system 7a to the chamber 26.

The bore in the longitudinal axis of the pressure splitter body accommodates at the compressor outlet end ($p_2$) a labyrinth spindle 8 producing restriction orifices or throttling places and a spring 10 which supports the labyrinth spindle 8 at the ambient air end. According to the present invention, the bore 18 for bleeding the partial pressure $p_z$ is located within the area of the first few restriction orifices as viewed in the flow direction of the compressor delivery air.

At its upper end, the labyrinth spindle 8 is operatively connected with bimetallic discs 11 enclosed by a cage 27 and held in position in the axial direction thereof. The preheated compressor delivery air flows through the ports of cage 27 against the bimetallic discs 11 which press the labyrinth spindle 8 against the spring 10 when the temperature rises, which, as described above, results in a decrease of the number of restriction orifices between the compressor delivery pressure $p_2$ and the control pressure $p_z$ and in an increase of the number of restrictor orifices between the control pressure $p_z$ and the ambient pressure $p_1$.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A control device for gas turbine engines which includes a compressor and a turbine, and in which fuel metering is controlled by the compressor delivery pressure, characterized in that the amount of fuel to be metered is influenced by a partial pressure ratio which is a function of the over-all compressor pressure ratio, and in that control pressure signals are taken as partial pressure signals from series-connected restriction orifices which are in communication with the compressor inlet pressure and the compressor delivery pressure.

2. A control device according to claim 1, characterized in that the number of restriction orifices between the compressor delivery pressure $p_2$ and the control pressure $p_z$ as well as between the control pressure $p_z$ and the compressor inlet pressure $p_1$ can be varied.

3. A control device according to claim 2, characterized in that the restriction orifices are formed by means which includes a pressure splitter means having a labyrinth spindle means.

4. A control device according to claim 3, characterized in that the labyrinth spindle means is axially displaceable by a set screw.

5. A control device according to claim 3, characterized in that the labyrinth spindle means is axially displaceable by temperature-sensitive means.

6. A control device according to claim 4, characterized in that the labyrinth spindle means is axially displaceable by temperature-sensitive bimetallic discs.

7. A control device according to claim 3, characterized in that the control pressure signal is taken off in the pressure splitter means only at the first restriction orifices as viewed in the flow direction.

8. A control device according to claim 7, characterized in that at least 25 restriction orifices are provided between the compressor inlet and the delivery pressure to ensure a fine fuel control.

9. A control device according to claim 8, characterized in that the variation of the number of restriction orifices is effected as a function of the air temperature at the compressor inlet.

10. A control device according to claim 8, characterized in that the variation of the number of restriction orifices as a function of the compressor delivery air temperature is effected upstream of a combustion chamber.

11. A control device according to claim 1, characterized in that the restriction orifices are formed by means which includes a pressure splitter means having a labyrinth spindle means.

12. A control device according to claim 11, characterized in that the labyrinth spindle means is axially displaceable by a set screw.

13. A control device according to claim 11, characterized in that the labyrinth spindle means is axially displaceable by temperature-sensitive means.

14. A control device according to claim 11, characterized in that the control pressure signal is taken off in the pressure splitter means only at the first restriction orifices, as viewed in the flow direction.

15. A control device according to claim 1, characterized in that at least 25 restriction orifices are provided between the compressor inlet and the delivery pressure to ensure a fine fuel control.

16. A control device according to claim 2, characterized in that the variation of the number of restriction orifices is effected as a function of the air temperature at the compressor inlet.

17. A control device according to claim 2, characterized in that the variation of the number of restriction orifices as a function of the compressor delivery air temperature is effected upstream of a combustion chamber.

18. A fuel control device for use on gas turbine engines of the type having a combustion chamber and a compressor which accepts air at a compressor inlet pressure and discharges air at a compressor delivery pressure; said control device comprising: metering means for metering fuel to the combustion chamber as a function of both the compressor delivery pressure and of a control partial pressure which is dependent on the ratio of compressor delivery pressure to compressor inlet pressure, and a pressure splitter means for supplying the control partial pressure to the metering means, said pressure splitter means including a housing with a first chamber subjected to compressor delivery pressure and a second chamber subjected to compressor inlet pressure, said first and second chambers being spaced from one another and being in communication with one another by way of a throttling means, said throttling means including a plurality of flow restrictors arranged in series with respect to one another and with respect to the first and second chambers, adjacent restrictors forming restriction openings therebetween, said pressure splitter further including a control partial pressure opening arranged for communication with one of said restrictor openings for transferring the control partial pressure to said metering means.

19. A control device according to claim 18, characterized in that said throttling means includes a labyrinth spindle means extending through a part of said housing said labyrinth spindle means including a rod with a plurality of cam-type rings spaced along the length thereof, said housing having inner walls spaced from the periphery of said rings for forming the flow restrictors in conjunction with said rings.

20. A control device according to claim 19, characterized in that said rod is cylindrical and said rings are arranged at the rod's circumference equally spaced along the entire length of the rod, said rod extending from the first chamber to the second chamber by way of a cylindrical bore in said housing, said control partial pressure opening extending from said cylindrical bore to the outside of the housing.

21. A control device according to claim 20, characterized in that said control partial pressure opening is arranged closer to said first chamber than to said second chamber whereby a greater number of restrictions are positioned between the second chamber and said opening than between the first chamber and said opening.

22. A control device according to claim 19, characterized in that said labyrinth spindle means is adjustable within said housing such that the number of restrictors between the first chamber and the control partial pressure opening can be varied to influence the control partial pressure at a given inlet and delivery pressure.

23. A control device according to claim 22, characterized by an adjusting set screw abutting one end of the labyrinth spindle means.

24. A control device according to claim 22, characterized in that a temperature sensing and control means is arranged inside of at least one of said first and second chambers for varying the position of said spindle means as a function of the air temperature in the respective chamber.

25. A control device according to claim 24, characterized in that said temperature sensing and control means includes a plurality of temperature-sensitive bimetallic discs arranged to abuttingly contact the spindle means.

26. A control device according to claim 20, characterized in that at least 25 substantially similar cam-type rings are arranged on said rod.

27. A control device according to claim 20, characterized in that each of said rings is symmetrical with respect to a central plane extending substantially perpendicular to said rod.

28. A control device according to claim 20, characterized in that each of said rings has a solid cross-section from the rod to the periphery of the ring such that fluid flow is permitted only between the housing walls and the periphery of the rings.

29. A fuel control device according to claim 22, further comprising means for influencing said partial pressure by the temperature of one of the pressure media consisting of said delivery and inlet pressures.

30. A fuel control device according to claim 22, wherein said partial pressure is influenced as a function of the temperature of the ambient air.

31. A fuel control device according to claim 22, wherein said partial pressure is influenced as a function of the temperature of the air at the delivery end of the compressor.

* * * * *